Griffin B. Halsted's Impvmts in Dampers for Stoves
4183
Fig: 1. REISSUED NOV 22 1870
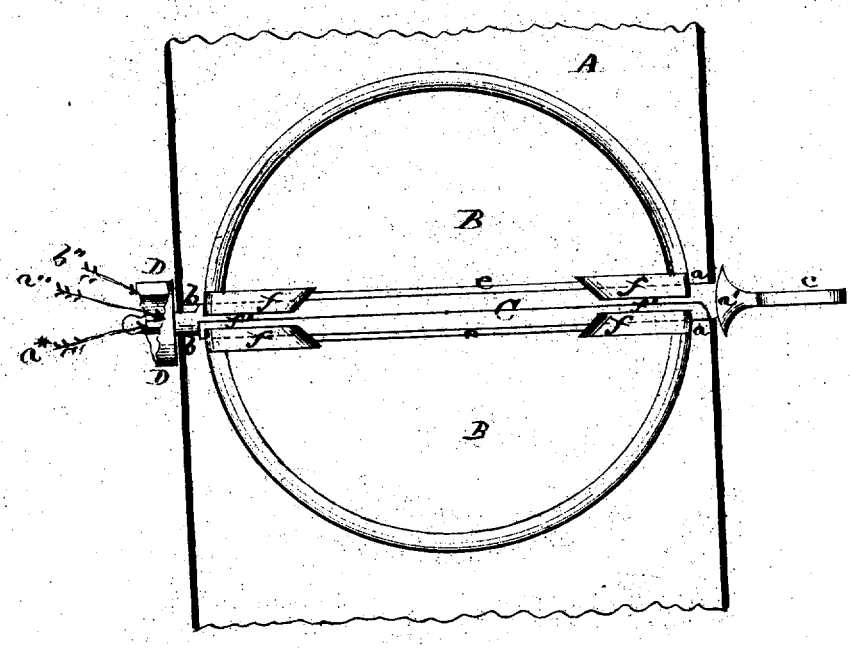
Fig: 2.
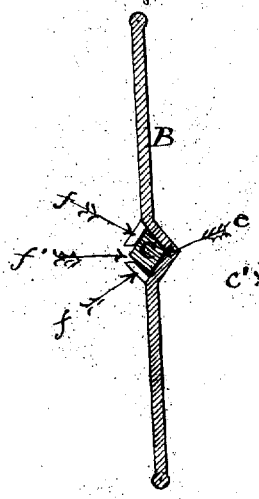
Fig: 3.
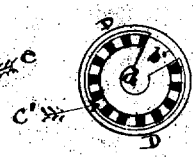
Fig: 4
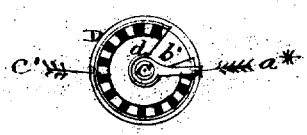
Witnesses.
C. S. Parrish
Franklin Parrish.
Inventor.
Griffin B. Halsted

United States Patent Office.

GRIFFEN B. HALSTED, OF BROOKLYN, NEW YORK.

Letters Patent No. 70,836, dated November 12, 1867; reissue No. 4,183, dated November 22, 1870.

IMPROVEMENT IN STOVE-PIPE DAMPERS

The Schedule referred to in these Letters Patent and making part of the same.

*To all whom it may concern:*

Be it known that I, GRIFFEN B. HALSTED, of Brooklyn, Kings county and State of New York, have invented certain new and useful Improvements in Dampers for Stoves, &c.; and I do hereby declare that the following is a full description of the same, reference being had to the accompanying drawing, in which the same letters of reference, wherever they occur, refer to like parts.

Figure 1 is a vertical transverse section of a stove-pipe fitted with a damper made on the principle of my invention.

Figure 2 is a detached sectional view of the damper.

Figures 3 and 4 are detached end views of a portion of the invention.

The object of this invention is to provide an efficient means whereby the elasticity of the stove-pipe may be employed to hold the damper in any desired position; and It consists in a notched friction-ring, in combination with a lateral spur, formed upon one end of the damper-shaft, whereby the desired result is secured.

The invention further consists in constructing the aforesaid friction-ring of a cam-like shape, in such manner that, by turning the same with reference to the damper-shaft, it may be adjusted to compress the pipe to a greater or lesser degree, in order to increase or decrease the friction exerted by the pipe upon the aforesaid damper-shaft, and thus effectually insure the requisite retention of the damper in the position required.

The invention further consists in the novel means of constructing the damper, whether made of cast-iron, or plate, or sheet metal, whereby the aforesaid spurred damper-shaft may be fitted into it, without involving any increased expenditure of time or labor as compared with that required in fitting the ordinary damper to its shaft.

To enable others to understand the nature and construction of my invention, I will proceed to describe the same by reference to the accompanying drawing.

A represents the stove-pipe, which may be of any ordinary or suitable form, and within which is placed a cast-iron, or plate, or sheet-metal damper, B, and held in place therein by means of the shaft C, the ends of which work in bearings formed by holes in the opposite sides of the pipe A, as shown at *a b*.

One end of the damper-shaft C is provided with a knob or handle, *c*, whereby it may be turned upon its horizontal axis when required to adjust the damper.

The inner portion, *a'*, of the knob *c* is enlarged in such a manner that its annular inner surface will constitute a friction, which rests in contact with the side of the pipe, as shown in fig. 1, and the purpose of which will presently hereinafter appear.

The opposite end of the damper-shaft C is furnished with a space, *a**, situated at right angles to the said shaft, as represented more clearly at fig. 4.

D indicates a friction-ring, the central opening, *d*, of which is recessed at one side, as shown at *b'*, to permit the passage through it of the spur *a** of the damper-shaft, as herein presently fully set forth.

Formed around the greater portion of the circumference of this friction-ring, upon the outer side thereof, is a rim, *c'*, which gives the cam-like form to the ring D, the outer surface of the said rim gradually increasing its distance from the base of the ring from the point *a''* to the point *b''*, as shown more fully in fig. 1.

The aforesaid rim *c'* is furthermore notched or indented throughout its entire length, as represented in figs. 1, 3, and 4.

The damper, with the shaft C, being in position, as hereinbefore set forth, the cam-shaped ring D, just described, is placed upon the spurred extremity of the damper-shaft, the recess *b'* allowing the spur *a** of the said shaft to be passed through the aforesaid ring, which being done, the latter is partially turned around to bring the spur *a** upon the rim *c'* of the same, the pipe A being clamped, as it were, between the inner friction-surface of the part *a'* of the knob *c*, and the corresponding inner surface of the cam-shaped friction-ring, the pipe may, within certain limits, be compressed to any required degree by placing the spur *a** of the damper-shaft upon a more or less elevated part of the rim *c'* of the said ring, the elasticity of the pipe thus compressed causing the same to press against the inner surfaces of the ring D and knob *c*. The friction between the said surfaces and the sides of the pipe securely holds the shaft C, and, consequently, the damper B, in any position to which it may be turned, by means of the knob or handle *c* of the shaft, as hereinbefore mentioned, the spur fitting into one of the notches or indentations of the rim *c'* of the friction-ring D, in such manner as to cause the ring to turn with the shaft, and be thus retained in proper position with reference thereto.

The damper B may be made of either cast-iron or from plate or sheet metal. When made of cast metal the transverse angular groove *e*, and the two lips *f*, as shown in figs. 1 and 2, for overlapping the sides of the damper-shaft C, to hold it in the groove *e*, is formed at the time of molding and casting the damper; but when made of plate or sheet metal the lips *f* will be formed by cutting slits in the plate and striking them up in dies, while, at the same operation, forming the transverse groove *e* for the damper-shaft to rest in.

It will be obvious that the making of the lips at the margin of the damper is not material. If they are made in the central part of the damper, and the groove *e* at the margins of it, the damper-shaft C will be equally as securely held in place as when secured in the way shown in the drawing, fig. 1; I therefore design to construct the damper in either way, and of either cast or sheet metal, as convenience and economy of manufacture may, from time to time, suggest.

The connecting of the damper-shaft C with the damper is effected, when in the pipe A, by inserting the spur end of it through one of the holes *a* of the pipe, and thence longitudinally underneath the lips *f*, the space *f'* between the lips allowing the passage of the spur *a**, so that, by these means, the damper may be attached to its shaft without any difficulty or waste of time.

I do not claim, broadly, retaining the damper in position by means of the elasticity of the pipe, as that has been done before; but

What I claim as my invention, and desire to secure by Letters Patent, is—

1. The notched friction-ring, in combination with the spurred shaft of the damper, substantially as described, and for the purposes set forth.

2. The friction-ring, constructed with a cam-like surface, whereby the compression of the pipe may be increased by turning the friction-ring with reference to the damper-shaft, substantially as described, and for the purposes set forth.

3. A cast-iron or plate or sheet-metal damper B, constructed with the angular groove *e* and lips *f*, arranged transversely of the damper, substantially as described, whereby the damper may be readily attached to its spurred shaft, as set forth.

Witnesses: GRIFFEN B. HALSTED.

CHARLES L. BARRITT,

FRANKLIN BARRITT.